United States Patent [19]

Shepherd

[11] Patent Number: 4,534,754

[45] Date of Patent: Aug. 13, 1985

[54] FEEDER FOR CENTRIFUGAL APPARATUS

[75] Inventor: David Shepherd, Cheshire, England

[73] Assignee: Imperial Chemical Industries PLC, Hertfordshire, England

[21] Appl. No.: 615,273

[22] Filed: May 30, 1984

[30] Foreign Application Priority Data

Jun. 7, 1983 [GB] United Kingdom ................ 8315611

[51] Int. Cl.$^3$ ........................ B01D 45/12; B04B 11/00

[52] U.S. Cl. .......................................... 494/37; 494/85

[58] Field of Search ........................ 494/85, 22, 23, 27, 494/28, 29, 56, 57, 58, 59, 84, 82; 210/360.1, 360.2

[56] References Cited

U.S. PATENT DOCUMENTS 1,355,559 10/1920 Mauss .................................... 494/23

3,606,142 9/1971 Westberg .............................. 494/85

4,120,448 10/1978 Cullis .................................... 494/27

4,479,790 10/1984 Bocckino .............................. 494/85

*Primary Examiner*—Robert W. Jenkins

*Attorney, Agent, or Firm*—Cushman, Darby & Cushman

[57] ABSTRACT

An apparatus and method for providing an accurately regulated flow of liquid medium to a device mounted in or on a rotor of a centrifuge, comprises a scoop on the rotor having a mouth opening forwards in the direction of rotation, with a duct connecting the mouth to the device; the liquid medium being projected as a jet into the path of the rotating scoop so that the mouth chops out a mid-portion of the jet during each revolution, and feeds it to the device. Rotation rates are high, typically 50,000 rpm for devices like liquid flow density balances for mass detection, but may be less and/or variable with SFFF devices.

9 Claims, 3 Drawing Figures

FEEDER FOR CENTRIFUGAL APPARATUS

Figure 1:
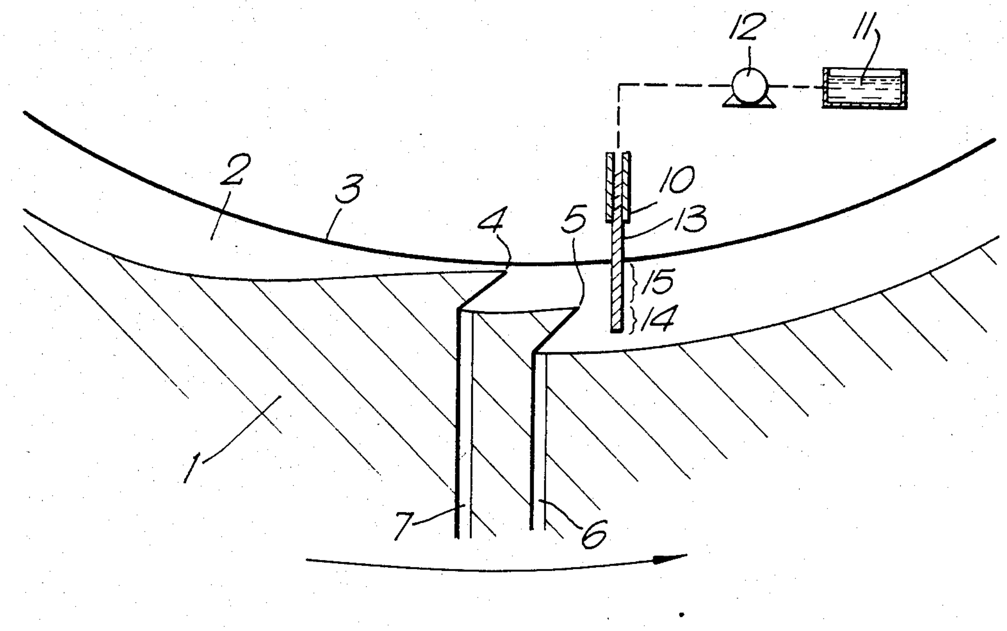

The invention relates to apparatus for providing an accurately regulated flow of liquid to a rapidly rotating body, which is particularly suited to centrifugal analytical techniques such as sedimentation field flow fractionation and mass detection by liquid flow density balances.

Sedimentation field flow fractionation (SFFF) is a technique for separating different species of small particles or macromolecules from a mixture, in which the mixed species are introduced into a narrow column through which liquid eluent passes with unidirectional laminar flow while a strong gravitational field is applied by mounting the column in a rotor of a centrifuge, to lie at a constant distance from the axis of rotation of the centrifuge.

Particularly useful columns are channel shaped, with an inward-facing base and sides extending inwards from the base towards the axis of the rotor, thereby to enable liquids to flow along the column as a layer on the base of the channel with a free surface of the liquid towards the axis. With gravitational fields of 20,000 G or more, the depth of liquid needed in the channel to effect separation, and hence the volume, can be very small indeed.

In fluid flow density balances, the flow of a first fluid is balanced against the flow of a second fluid, both flowing parallel to a gravitational field, such that if a small quantity of any substance of different density is introduced into one or other of the fluids, there will be an imbalance. Thus if, for example the first fluid were pure eluent from a reference column of an SFFF apparatus, and the second fluid were eluent in which there appeared from time to time a further material, e.g. a component of a mixture separated in a fractionation column of the SFFF apparatus, the two balanced flows would become unbalanced as the component of different density appeared in one side of the balance. High gravitational fields enhance this effect, and mass detection by fluid flow density balances is a particularly useful technique for use in detecting fractions emerging from an SFFF column, as both the column and the balance can be mounted on the same centrifuge rotor, although they can, of course, also be used to good effect in other applications where small masses require detection. Again use of very high gravitational forces enables very small sample volumes to be used. Indeed with fields in the region of 100,000 G, cell volumes can be very low, e.g. 1/50 l, together with sensitivities of the order of one in $10^{12}$ provided the flow rates are controlled to the same order.

However, commercial pumps, even those designed for chromatography work, are rarely accurate to better than 1 part in $10^6$, so there is a clear need for more accurately controlled means for feeding the various liquids.

According to one aspect of the invention, an apparatus for providing a regulated flow of liquid medium to a device mounted in or on a rotor of a centrifuge rotatable with respect to a housing, comprises in combination, a scoop located in or on the rotor and comprising a mouth opening forwards in the direction of rotation of the rotor and a duct connecting the mouth to the device; and a nozzle located in or on the housing and being adapted for receiving the liquid medium from a source and for projecting the received liquid medium as a free moving jet into the path of the scoop as it rotates with the rotor;

the scoop, source of liquid medium and nozzle all being mutually dimensioned and positioned such that during operation as the rotor rotates, the mouth of the scoop strikes and removes a mid-portion of the jet of liquid medium and directs it via the duct to the device, the continuing projection of the liquid medium then extending the jet again beyond the path of the scoop so that a further mid-portion of the jet can be removed during each subsequent revolution of the rotor.

It should be emphasised here that it is a mid-portion and not a free end portion of the jet that is removed during each revolution of the rotor. In this way a constant length of jet is fed to the device each time. If the rate of growth of the jet were insufficient to extend it beyond the path of the rotating scoop between successive contacts with the scoop, and a free end portion thereof removed each time round, any fluctuations in the rate of supply to the liquid medium from the source to the nozzle would be passed on, through variations in jet length, to the device, and no improvements over the source pump performance could be achieved.

For some rotor-mounted devices, such as SFFF apparatus, it is desirable for them to extend completely round the axis of rotation, or as nearly so as can be arranged, in order to maximise the length of the active features of the device, e.g. of the columns in the case of SFFF apparatus. For such applications, a preferred apparatus is one wherein the rotor has a groove aligned with the nozzle and extending at least part way round the rotor's axis of rotation such that, as the rotor rotates, a free moving jet of liquid medium, when supplied through the nozzle, becomes directed in turn towards the various portions of the groove along its length as the rotor rotates; the rotor having two adjacent barriers across the groove to block the flow of liquid medium around the groove, the two barriers each having a free edge shaped to provide respectively first and second cutting edges substantially transverse to their direction of motion as the rotor rotates, the height of the first cutting edge with respect to the depth of the goove being less than that of the second and both cutting edges facing the the direction of rotation thereby to provide between them the mouth of the scoop and to define the length of the mid-portion of the jet captured by the mouth, the groove ahead of the first cutting edge having means to discard any liquid medium collected therein.

Between the two cutting edges, the contours of the groove provide the remainder of the scoop, and hence need to be shaped so that under the centrifugal forces generated by the rotor's rotation, they serve to retain the captured mid-portion of the liquid medium and direct it to the duct for the device. The remainder of the groove extending round the rotor, provides room for the jet to grow by more than its mid-portion length, and for this purpose it does not need to have any specific shape, just adequate depth. However, it will receive liquid medium, e.g. the end portion of the jet as the latter is severed from the mid-portion by the first cutting edge and possibly also splashes from elsewhere, and if it merely discarded such accumulated medium over the edges of the groove, there may be a danger of undesirable splash-over into other parts of the apparatus. To avoid this we prefer that the means to discard liquid medium collected in the groove ahead of the first cutting edge comprises a duct extending therefrom to an opening in a peripheral surface of the rotor from which any liquid flowing through the duct becomes discharged, the groove being shaped both within the scoop and ahead of the first cutting edge so as to retain liquid medium therein during rotation of the rotor and to direct any such liquid medium retained in either case to flow towards the duct for the device or towards the discharge duct respectively, under centrifugal forces generated by the rotation.

One convenient form of groove is an inward facing groove having sides extending towards the axis of rotation. The barriers will then similarly extend inwards with the two cutting edges at different radial distances. An alternative, which is suitable for use in disc shaped rotors having a surface orthogonal to the axis, is to form the groove in that surface. As will be appreciated, such a groove if formed with parallel sides extending perpendicularly to the surface, would spill out all liquid medium as it rotated, and hence, at least around the cutting edges, the outer wall needs to be inclinded outwards as it descends into the rotor from the surface, in order to retain any liquid medium.

For other centrifugal devices, e.g. liquid flow density balances for detecting the presence of higher density particles in liquids, which do not need a full toroidal or disc-shaped rotor, a rotating arm for supporting the device may be sufficient. For such applications we prefer an apparatus wherein the rotor comprises an elongated arm rotatable about the axis and the direction of rotation defining a leading face and a trailing face, the rotor having a groove extending from the leading face to the trailing face and positioned to become aligned with the nozzle during each rotation of the rotor; the interface between the groove and the leading face being shaped to produce a first cutting edge, and a barrier being provided across the groove to prevent flow of liquid therealong, with a free edge of the barrier being shaped to form a second cutting edge facing in the direction of rotation, the two cutting edges thereby providing the mouth of the scoop between them and defining the length of the mid-portion of the jet captured by the mouth.

The rate of supply of liquid medium to the device can be varied by varying the rate of rotation of the rotor. For example, an apparatus catching 50,000 mid-portion lengths of 1 cm every minute, will feed the liquid at a greater rate than one catching only 20,000 of the 1 cm mid-portion lengths (it being assumed that the rate of jet growth is also increased accordingly). However, it is not always desirable to vary the rate of rotation where this could also vary the efficiency of the rotor-mounted device. Moreover, for many applications it is necessary to have two scoops collecting fluid medium from two nozzles, one for containing a sample and one for use as a reference. Thus for the fluid flow density balance described above, the two liquid flows are balanced one against the other. In such a case it is generally desirable to be able to change the rate of one flow relative to the other, and varying the rate would affect both flow rates.

We have now found that we can achieve this desideratum by using an apparatus wherein at least one of the cutting edges is adjustable in its position or height in the groove with respect to the other cutting edge, thereby to vary the length of the mid-portion of the jet captured by the scoop and correspondingly to vary the rate at which the fluid medium is supplied to the device. It should be noted, however, that where it is the position along the groove that is changed, the change in quantity captured is achieved by the corresponding change in the time interval between the two cuts, and hence may introduce error if the jet feed rate should vary. In practice such errors should be very small provided the positions are adjacent, but to avoid this risk adjustment of the height is preferred.

According to a further aspect of the invention, a method for providing a regulated flow of liquid medium to a device mounted in or on a rotor of a centrifuge, comprises providing the rotor with a scoop having an open mouth connected to the device by a duct and rotating the centrifuge so that the mouth faces in the direction of rotation, supplying the liquid medium continuously in the form of a free moving jet into the path of the scoop such that the mouth impinges on the jet during each revolution of the rotor, thereby to transmit an impinged portion of the jet through the mouth and along the duct to the device, and continuing to supply the liquid medium at a rate which is greater than the rate at which medium passes through the mouth thereby to cause only a mid-portion of the jet to be captured by the mouth.

A liquid medium in the context of this invention may be a pure liquid, such as a solvent, a mixture of liquids, or a solution or suspension of a solid or a gas in a liquid.

The present apparatus and method may be advantageously used for various applications where an accurately controlled feed of liquid medium is required in a rapidly rotating centrifuge. Although the liquid medium is chopped up into increments, we find that the size of such increments and the rapid rate at which they are fed, effectively causes a continuous flow. A preferred rate of rotation is at least 30,000 rpm, suitably 50,000 rpm, although rates as low as 1000 rpm can be used with only small reductions in consistency. Higher rates are currently limited by engineering considerations, but would be expected to improve the flow where they can be achieved. In SFFF, programming of the rotation can be made to program the liquid flow in a closely related fashion.

Figure 2:
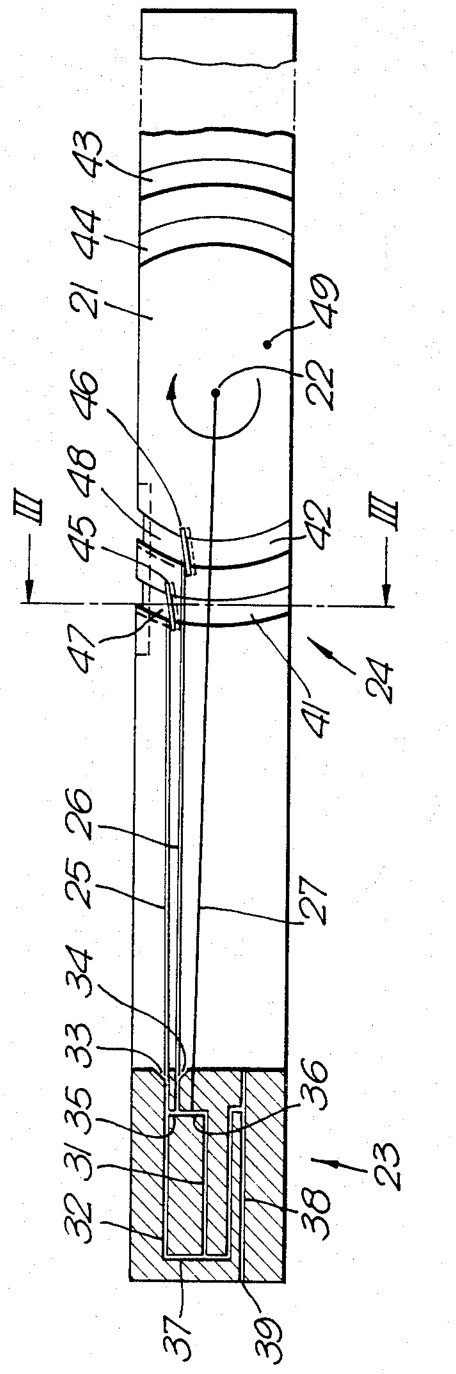
Figure 3:
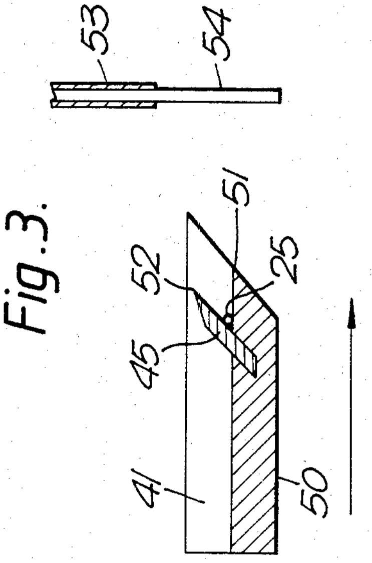

The invention is illustrated by reference to two specific embodiments thereof, shown in the accompanying drawings, in which FIG. 1 is a sketch showing in section part of a circular rotor incorporating one embodiment, with a diagrammatic representation of a liquid supply means, FIG. 2 is a view of the other specific embodiment showing a rotor viewed along the axis of rotation and incorporating a device (shown in section) to be supplied with liquid by the second embodiment, and FIG. 3 is a section along the line III—III on FIG. 2.

In the sketch of FIG. 1, the rotor 1 has a groove 2 formed around an inward facing surface 3. Extending inwards from the base of the groove are two knives (shown in section) with their blades 4, 5 facing forwards in the direction of travel, this being indicated by the arrow. The shorter knife typically extends beyond the base by a distance of 1 cm with the longer knife a further 1 cm beyond. From the outermost corner of each knife is a duct, that 6 from the shorter knife going to waste, and that 7 from the longer knife leading to a rotor mounted device (not shown). Thus the two knife blades 4, 5 bounded on either side by the groove 2 are the cutting edges forming the mouth of a scoop, which in turn is completed by the duct 7 for the device. The embodiment shown was designed for feeding, via duct 7, one column of an SFFF apparatus extending around the rotor, there being a corresponding parallel embodiment for feeding a second column. Also shown in the drawing is a nozzle 10, which is supplied with liquid medium from a reservoir 11, via a pump 12 of chromatography standard.

In use the pump supplies liquid medium to the nozzle under pressure to project a free jet 13 of the liquid medium towards the groove in the rotor. As the rotor rotates, the knives cut through the jet, the shorter knife chopping off an end portion 14, which then goes to waste through the duct 6 at the base of that knife, being flung away by centrifugal forces. The two knives between them chop out a mid-portion 15 of the jet, which disappears through the other duct 7 to the device. While the rotor completes each revolution, the pump continues to supply the nozzle with liquid medium, and the jet regrows until its free end again extends sufficiently for it to be chopped off by the shorter knife, the pumping rate being adjusted until this is so. Thus knives whose heights differ by 1 cm, will always chop off a mid-portion length of 1 cm despite any minor fluctuations in the pumping rate. The discarded end portion, chopped off by the shorter knife, will contain any variations due to pumping fluctuations. For very low flow rates, the jet can be filled out with added compressed gas, which will increase jet velocity to give a more accurate chop.

The shape of the rotor can be designed to suit the device being carried. An SFFF apparatus requires at least the sample channel (and preferably also the reference channel) to extend around the rotor at a constant radius, and suitable rotors are generally of a circular configuration. However, where the device is small, a substantial portion of a circular rotor is unnecessary and a thin rectangular strip rotatable about its mid-point, may be more suitable. To illustrate this, FIG. 2 shows an embodiment of the invention applied to a sensitive mass detection device.

The rotor 21 is viewed along the axis of rotation 22, and has an overall rectangular shape with the axis 22 extending through the mid-point of that rectangle. At one end is a fluid flow density balance 23, while the other end is plain and has been shown foreshortened. Between the axis and the density balance lies the present feeder 24, connected to the balance by ducts 25, 26. Also extending from the balance to the axis are optical fibres 27 for taking light to and from the density balance and axis of rotation.

The specific configuration of balance shown comprises a sample arm 31 and a reference arm 32 lying substantially radial to the axis of rotation, and thus in line with the centrifugal forces generated when the rotor rotates. There are two inlets, 33, 34 with a very short link 35 between them. This in turn is connected to the sample arm 31 by a detection tube 36, against which the end of the twin optical fibre 27 is secured. The two parallel arms 31, 32 are connected at their outer ends by an outflow connection tube 37, which extends via a vented exit pipe 38 to an opening 39 in the outer surface of the rotor. In use, eluent containing dye is fed to one inlet 33 while uncoloured eluent is fed to the other inlet 34. With the rotor rotating at very high speeds, typically 20,000–50,000 rpm, these liquids will be caused to flow along the two arms 31, 32, to meet where the outflow connection tube meets the sample arm 31 and thence to continue together via the exit tube until expelled from the rotor through the opening 39. The two arms are connected by the link 35 and tube 36, but the flow rates of the two liquids are preferably balanced such that all the dye-containing eluent travels along the reference arm 32 and all the plain eluent stream travels along the sample arm 31. When the plain eluent stream contains a plug of more dense material (e.g. as in a fraction from a chromatography column), on reaching the sample arm the slight density difference between plug and the eluent in the reference arm, is magnified by the centrifugal forces, and causes a clockwise (from the FIG. 2 viewpoint) component to the flow around the balance. Thus the flow velocity in the sample arm increases, that in the reference arm decreases, and some dye-containing eluent is caused to flow through the link 35 and on towards the sample arm through the detection tube 36, where the dye is detected by means of the optical fibres 27.

The device thus operates by balancing the liquid flow velocities in the two arms. It is not essential for all the dye-containing eluent to flow along the reference arm in the absence of denser material in the sample arm, provided the flow rate is constant and there is sufficient difference in the flow rates under the two conditions of with and without sample respectively. As will therefore be appreciated, it is most important that the two liquids be fed to the device with as little variation in their respective flow rates as possible, and it is to this end that the feeder shown in FIGS. 2 and 3 has been developed.

The feeder 24, comprises two grooves 41, 42 in the rotor 21, with complementary grooves 43, 44 at a corresponding distance on the remote side of the axis. Set obliquely across each of the two main grooves 41, 42 is a blade-like barrier with a free edge shaped to produce a cutting edge 45, 46. Each duct 25, 26 runs from the corner between the outer edge of its groove and the base of its oblique blade, as shown in FIG. 3. The grooves 41, 42, 43 and 44 are curved about the axis of rotation 22 except for the leading portions 47, 48 of the main grooves 41, 42, (i.e. the portions ahead of the blade when the rotor rotates in the direction of the arrow in FIG. 3). These leading portions are curved about a centre 49 displaced from the axis of rotation, and their outer walls are inclined inwards from their bases. This configuration provides the corners from which the ducts start, at the greatest radial distances of any part of the leading portion from the axis of rotation. As a consequence, any liquid entering either leading part during rotations, will be caused to flow towards its duct. The leading edge of the rotor is swept forward from the under surface 50 upwards to the grooved surface, thereby forming a shape cutting edge 51 to the leading edge of the base of each groove. The oblique blade 45 also has a sharp cutting edge 52 at its leading upper extremity. Also shown in FIG. 3 is a nozzle 53 with a jet of liquid medium 54 issuing downwardly from it in line with the groove 41 shown, a second nozzle and accompanying jet (not shown) being provided in line with the other groove 42.

Operation of this FIG. 2/3 apparatus is essentially the same as described for the FIG. 1 apparatus. As the rotor rotates, the lower cutting edge 51 at the base of the groove severs the end off the jet 54, (which is rejected to waste), followed closely by the upper cutting edge 52 of the blade. The two cutting edges form the mouth of a scoop and thus take out a mid-portion of the jet 54, the angles of the grooves and blade directing the liquid towards the duct 25. After the blade has passed the jet continues to form, and the continuation of the groove behind the blade, as well as the remote corresponding groove 43, enable the jet to grow to its full length again before the knife edges return to scoop out a further mid-portion during the following rotation. All the chopped out portions follow each other down the duct, but with the very high chopping rate, this results in a very uniform continuous feed to one inlet 33 of the liquid flow density balance.

The other groove 42 has the same configuration, and operates in the same manner to chop out portions of the second jet with which it is aligned, these portions being fed via the other duct 26 to the other inlet 34 of the balance.

FIG. 1 shows the cutting edges formed from the rotor material, in contrast to the inserted blades 45, 46 of FIGS. 2 and 3. Each could, however, be formed in either way, and indeed various shapes of barrier could be inserted across the grooves of FIGS. 2 and 3 within the scope of the invention, provided they had a sufficiently abrupt leading edge to cut cleanly through the jet in the manner of the cutting edge 52. The provision of blades in the manner of FIG. 3, however, gives a form of construction which enables the feeding rate of either groove to be finely tuned by sliding the blades in or out of their retaining slots, as appropriate.

I claim:

1. Apparatus for providing a regulated flow of liquid medium to a device mounted in or on a rotor of a centrifuge rotatable with respect to a housing, comprises in combination, a scoop located in or on the rotor and comprising a mouth opening forwards in the direction of rotation of the rotor and a duct connecting the mouth to the device; and a nozzle located in or on the housing and being adapted for receiving the liquid medium from a source and for projecting the received liquid medium as a free moving jet into the path of the scoop as it rotates with the rotor;

the scoop, source of liquid medium and nozzle all being mutually dimensioned and positioned such that during operation as the rotor rotates, the mouth of the scoop strikes and removes a mid-portion of the jet of liquid medium and directs it via the duct to the device, the continuing projection of the liquid medium then extending the jet again beyond the path of the scoop so that a further mid-portion of the jet can be removed during each subsequent revolution of the rotor.

2. Apparatus as claimed in claim 1 wherein the rotor has a groove aligned with the nozzle and extending at least part way around the rotor's axis of rotation such that, as the rotor rotates, a free moving jet of liquid medium, when supplied through the nozzle, becomes directed in turn towards the various portions of the groove along its length as the rotor rotates; the rotor having two adjacent barriers across the groove to block the flow of liquid medium around the groove, the two barriers each having a free edge shaped to provide respectively first and second cutting edges substantially transverse to their direction of motion as the rotor rotates, the height of the first cutting edge with respect to the depth of the groove being less than that of the second and both cutting edges facing in the direction of rotation thereby to provide between them the mouth of the scoop and to define the length of the mid-portion of the jet captured by the mouth, the groove ahead of the first cutting edge having means to discard any liquid medium collected therein.

3. Apparatus as claimed in claim 2 wherein the means to discard liquid medium collected in the groove ahead of the first cutting edge comprises a duct extending therefrom to an opening in a peripheral surface of the rotor from which any liquid flowing through the duct becomes discharged, the groove being shaped both within the scoop and ahead of the first cutting edge so as to retain liquid medium therein during rotation of the rotor and to direct any such liquid medium retained in either case to flow towards the duct for the device or towards the discharge duct respectively, under centrifugal forces generated by the solution.

4. Apparatus as claimed in claim 1 wherein the rotor comprises an elongated arm rotatable about the axis and the direction of rotation defining a leading face and a trailing face, the rotor having a groove extending from the leading face to the trailing face and positioned to become aligned with the nozzle during each rotation of the rotor; the interface between the groove and the leading face being shaped to produce a first cutting edge, and a barrier being provided across the groove to prevent flow of liquid therealong, with a free edge of the barrier being shaped to form a second cutting edge facing in the direction of rotation, the two cutting edges thereby providing the mouth of the scoop between them and defining the length of the mid-portion of the jet captured by the mouth.

5. Apparatus as claimed in any one of claims 2 to 4 wherein at least one of the cutting edges is adjustable in its position or height in the groove with respect to the other cutting edge, thereby to vary the length of the mid-portion of the jet captured by the scoop and correspondingly to vary the rate at which the fluid medium is supplied to the device.

6. Apparatus as claimed in claim 1 wherein the rotor-mounted device comprises a liquid flow density balance, the apparatus having two nozzles for producing jets from different liquid medium sources, and two scoops each aligned to catch the mid-portion of a different jet from the other, the scoops being connected either directly or indirectly to supply the liquid medium so caught to opposite sides of the liquid flow density balance.

7. A method for providing a regulated flow of liquid medium to a device mounted in or on a rotor of a centrifuge, comprises providing the rotor with a scoop having an open mouth connected to the device by a duct and rotating the centrifuge so that the mouth faces in the direction of rotation, supplying the liquid medium continuously in the form of a free moving jet into the path of the scoop such that the mouth impinges on the jet during each revolution of the rotor, thereby to transmit that portion of the jet which is impinged, through the mouth and along the duct to the article, and continuing to supply the liquid medium at a rate which is greater than the rate at which medium passes through the mouth thereby to cause only a mid-portion of the jet to be captured by the mouth.

8. A method as claimed in claim 7 when carried out while the rotor is rotated at a rate of at least 1000 rpm.

9. A method as claimed in claim 8 wherein the rate of rotation is at least 20,000 rpm.

* * * * *